United States Patent [19]

Brenner

[11] Patent Number: 4,982,938
[45] Date of Patent: Jan. 8, 1991

[54] HYDRAULIC DAMPING ELASTIC BEARING

[75] Inventor: Heinrich Brenner, Ahrweiler, Fed. Rep. of Germany

[73] Assignee: Boge AG, Eitorf, Fed. Rep. of Germany

[21] Appl. No.: 328,466

[22] Filed: Mar. 24, 1989

[30] Foreign Application Priority Data

Mar. 26, 1988 [DE] Fed. Rep. of Germany ....... 3810310

[51] Int. Cl.⁵ ............................................... F16F 9/34
[52] U.S. Cl. ................................ 267/140.1; 248/562; 267/141.2; 267/219
[58] Field of Search ................ 267/140.1 C, 140.1 R, 267/741, 141, 141.2, 141.3, 141.4, 141.5, 141.6, 219, 35; 248/560, 562, 565, 636, 638

[56] References Cited

U.S. PATENT DOCUMENTS

| 4,690,389 | 9/1987 | West | 267/140.1 |
| 4,728,086 | 3/1988 | Ishiyama et al. | 267/140.1 |
| 4,768,760 | 9/1988 | Le Fol | 267/219 X |
| 4,822,010 | 4/1989 | Thorn | 207/140.1 |
| 4,834,351 | 5/1989 | Freudenberg et al. | 267/140.1 |
| 4,838,529 | 6/1989 | Orikawa et al. | 248/562 |

FOREIGN PATENT DOCUMENTS

| 0234966 | 9/1987 | European Pat. Off. | |
| 0118133 | 5/1987 | Japan | 267/140.1 |

Primary Examiner—Matthew C. Graham
Attorney, Agent, or Firm—Nils H. Ljungman & Associates

[57] ABSTRACT

A hydraulic damping elastomeric bearing includes an internal element, an external element disposed around the internal element to be radially spaced therefrom, and an elastomeric spring disposed between the internal element and the external element. The elastomeric spring has a cavity therein and defines a sealed boundary of the cavity. The cavity includes at least two chambers for being filled with a damping fluid. A throttling channel is for throttled fluid connection of at least one of the chambers and at least another of the chambers.

11 Claims, 3 Drawing Sheets

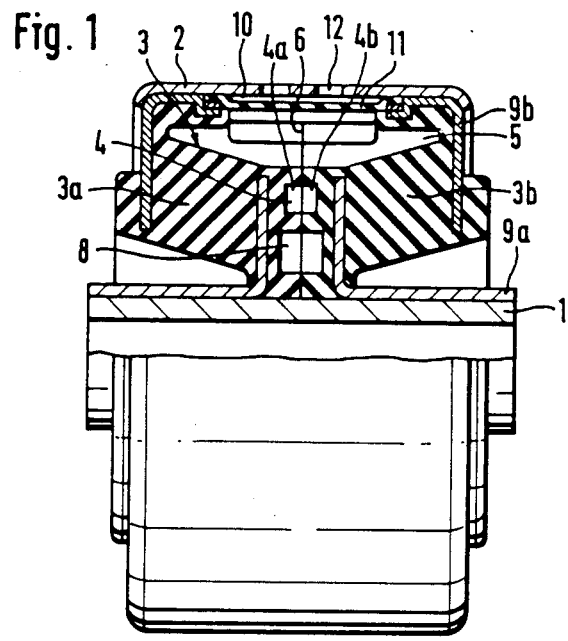
Fig. 1
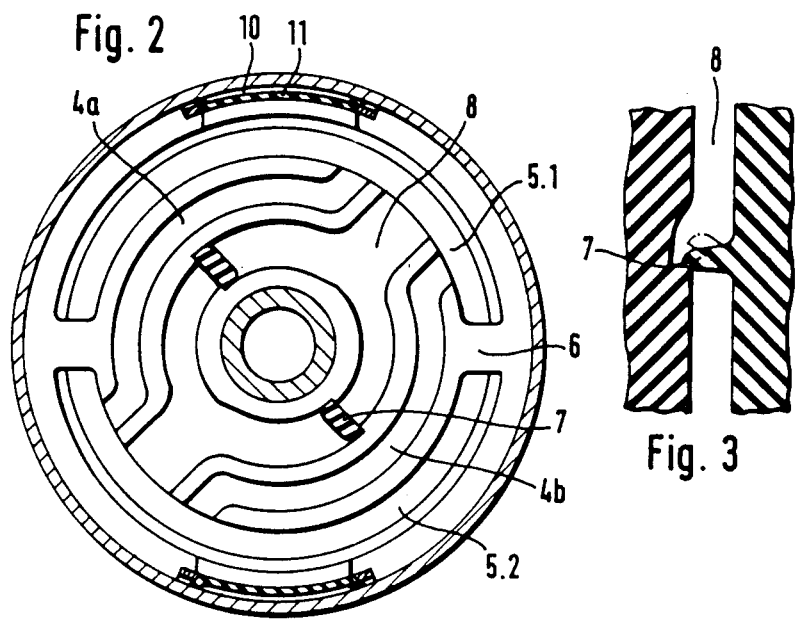
Fig. 2
Fig. 3

HYDRAULIC DAMPING ELASTIC BEARING

BACKGROUND OF THE INVENTION

1. Field of the Invention

This invention relates to a hydraulic damping elastic or rubber bearing of a type which includes an internal tube, an external tube located at some radial distance from the internal tube, and a rubber spring element disposed between the internal and external tubes. The rubber spring element includes chambers which are filled with damping fluid and connected hydraulically to one another by means of throttle passages. The preferred chambers which are bounded exclusively by the rubber spring are formed and are externally sealed, whereby at least two chambers are connected to one another by means of a passage having at least one valve.

2. Description of the Prior Art

The prior art includes rubber bearings, such as those disclosed in European Laid Open Pat. Application No. 234,966 and U.S. Pat. No. 4,690,389. Such rubber bearings can comprise an internal tube, an external tube located some distance from the internal tube, and a rubber piece inserted therebetween. However, in the area of the chambers, the rubber part is outwardly designed only as a seal, and is thereby subjected to tensile forces in operation. This area cannot be used as a bearing spring, and is not capable of travelling great distances in the radial direction.

All of the above-mentioned patents and patent applications are incorporated herein by reference as if the entire contents thereof were fully set forth herein.

OBJECTS OF THE INVENTION

It is an object of the invention to provide a hydraulically damping rubber bearing.

It is further object to provide such a bearing in which the rubber portion thereof is subjected to shear forces.

It is another object to provide such a bearing which does not primarily damp high-frequency oscillations with small amplitudes, but strongly damps low-frequency oscillations with large amplitudes.

SUMMARY OF THE INVENTION

These and other objects of the invention are provided by the rubber or elastomeric spring which extends around the circumference of the internal and external tubes and is simultaneously designed as a seal element. A preferred embodiment includes a hydraulic damping elastomeric bearing which includes an internal element, an external element disposed around the internal element to be radially spaced therefrom, and an elastomeric spring disposed between the internal element and the external element. The elastomeric spring defines a cavity therein and provides sealing for a boundary of the cavity. The cavity includes at least two chambers for being filled with a damping fluid. A throttling channel is for throttled fluid connection of at least one of the chambers and at least another of the chambers.

Another embodiment includes a hydraulic damping elastic bearing which includes an internal element, an external element disposed around the internal element to be radially spaced therefrom, an elastic spring disposed between said internal element and the external element. The elastic spring defines a cavity means therein. The cavity includes at least two chambers for being filled with a damping fluid. A throttling channel is for throttled fluid connection of at least one of the chambers and at least another of the chambers. An additional connecting arrangement is for additional fluid connection of the at least one of the chambers and the at least another of the chambers, and includes a valve arrangement.

One advantage of this configuration is that the rubber or elastic part is simultaneously a bearing spring and a seal element. During the assembly of two rubber parts with the internal tube and the external tube, the complete bearing with hydraulic chambers and passages is formed. Such a design allows an economical and compact construction, which is composed of a few, simple individual parts.

A further advantage is that in addition to the throttle passage of the prior art, there is another parallel passage designed as a bypass. Oscillations with small amplitudes are damped by the normal throttle passage. For oscillations with large amplitudes, because of the large amount of damping fluid to be managed, this throttle passage would be effectively blocked. However, because of the increased pressure in one chamber, a valve in the parallel, bypass passage opens, and the damping fluid is allowed to flow almost undamped from one chamber into the chamber located opposite the one chamber.

According to another characteristic, the rubber spring consists of two identical, ring-shaped shear elements. The non-undercut configuration thereby allows the shear elements to be incorporated as an integral part of the partitions.

In one configuration of the invention, the throttle passages and/or the bypass passage are designed as recesses in the facing walls of the shear elements which form the throttle passage or the bypass passage when the parts are assembled.

An advantage is provided by the fact that the two identical shear elements are designed simultaneously as the bearing spring and the seal element and that the throttle passage and/or the bypass passage are formed in the central contact surface in one of the shear elements or in one-half in each of the two shear elements.

In another configuration of the invention, the valve is an integral part of the rubber spring.

In another configuration, an elastic rubber lip is advantageously provided as the valve.

To decouple high-frequency oscillations with small amplitudes, another characteristic of the invention is that in at least one chamber there is a recess which is sealed by a membrane. Such a design absorbs high frequency oscillations without damping.

In another configuration, the rubber spring has a reinforcement for fastening to the internal and/or the external tube.

BRIEF DESCRIPTION OF THE DRAWINGS

FIG. 1 is a side view, partially in section, of a preferred hydraulically damping rubber or elastomeric bearing including various features of the invention.

FIG. 2 is a cross-sectional view of the rubber bearing of FIG. 1 which has two fluid chambers.

FIG. 3 is an enlarged fragmentary sectional view of a valve of the bypass of the rubber bearing shown in FIG. 2.

DESCRIPTION OF THE PREFERRED EMBODIMENTS

Figure 4:
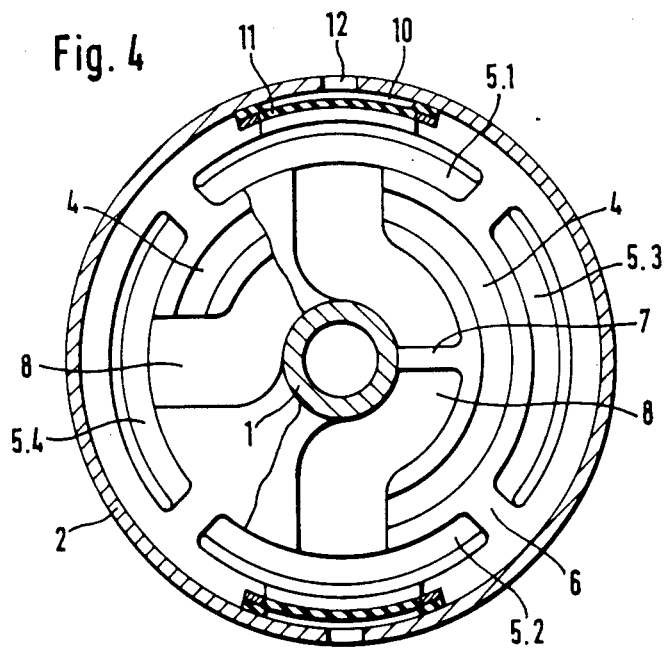
FIG. 4 is a cross-sectional view of a rubber bearing of the invention, similar to that shown in FIG. 1, which includes a total of four chambers.

As seen in FIG. 1, a preferred hydraulically damping rubber or elastomeric bearing comprises an internal tube 1 and an external tube 2 located concentrically or eccentrically in relation to the internal tube 1 and at some distance therefrom. A rubber or elastomeric spring or part 3 is disposed between the internal tube 1 and the external tube 2 and includes chambers 5. The chambers 5 are in the form of cavities in the rubber spring or part 3, are filled with a damping fluid and are hydraulically connected to one another by means of a throttle passage 4.

The rubber spring 3 is formed and composed of two identical shear elements 3a and 3b, each of which include reinforcements 9a and 9b to facilitate easy assembly. The two shear elements 3a and 3b each include recesses 4a and 4b in the facing surfaces 6 thereof. When the elements 3a and 3b are assembled, the recesses 4a and 4b respectively combine to form each of two throttle passages 4, only one of which is seen in FIG. 1. Addition recesses in the shear elements 3a and 3b combine on assembly to form a passage 8 which is designed as a bypass.

FIG. 2 shows a cross section of the rubber bearing shown in FIG. 1, as it would be generally seen along a plane adjacent the facing surfaces 6. The rubber spring 3 is located between the internal tube 1 and the external tube 2. In the preferred embodiment, the rubber spring 3 has a pair of chambers 5.1 and 5.2, which are connected to one another by means of two throttle passages 4 which are respectively located at the recesses 4a and 4b. Parallel to the throttle passages 4 at the recesses 4a and 4b, there is a passage 8 in the form of a bypass. A pair of valves 7, located in respective channels of the passage 8, are designed as check valves so that, at any given time, only one direction of flow through the passage 8 and one of its respective valves 7 is possible. As a result, bypass flow in the passage 8 from the chamber 5.1 into the chamber 5.2 is through one of the valves 7, and bypass flow in the passage 8 from the chamber 5.2 in the reverse direction to chamber 5.1 is through the other valve 7.

FIG. 3 is an enlarged fragmentary sectional view of a portion of the rubber spring 3 including one of the valves 7. Each valve 7 is respectively designed as an integral component of one of the shear elements 3a and 3b. An adjacent portion of the other shear element 3a and 3b severs as a stop or seat for each of the valves 7 to form a combined valve element which acts as a check valve.

FIG. 4 shows another embodiment of a rubber bearing of the invention including the rubber spring 3 which is disposed between an internal tube 1 and an external tube 2. In this embodiment, the chambers 5.1, 5.2, 5.3 and 5.4 are distributed around the circumference of the rubber spring 3. On the one hand, two of the chambers 5.1 and 5.2 are connected to one another by means of one throttle passage 4, and, on the other hand, the other two of the chambers 5.3 and 5.4 are connected to one another by means of another throttle passage 4. The throttle passages 4 are located next to one another in separate parallel planes which are displaced from one another in a direction which is perpendicular to the plane of the drawing. For each of the throttle passages 4, there is a corresponding passage 8 disposed in its corresponding plane. Each passage 8 is connected, in the form of a bypass, to be parallel to its respective throttle passage 4. Each passage 8 includes a valve 7 which is in the form of a rubber lip. The rubber lip is capable of closing the passage 8 but can be moved to either side as a function of the pressure conditions in the chambers connected thereby. When pressure oscillations with large amplitudes occur, the increased internal pressure in one of the chambers moves the rubber lip of the valve 7 to open the passage 8 as a bypass to the corresponding throttle passage 4. Each of the chambers 5.1 and 5.2 in this embodiment is respectively equipped with a recess 10, which provides decoupling by means of a membrane 11 and ventilation hole 12. For decoupling during operation, the high-frequency oscillations tend to move the membrane 11 without any damping by the throttle passage 4. Because the configuration includes four chambers 5.1, 5.2, 5.3 and 5.4, damping is possible in all radial directions.

Figure 5:
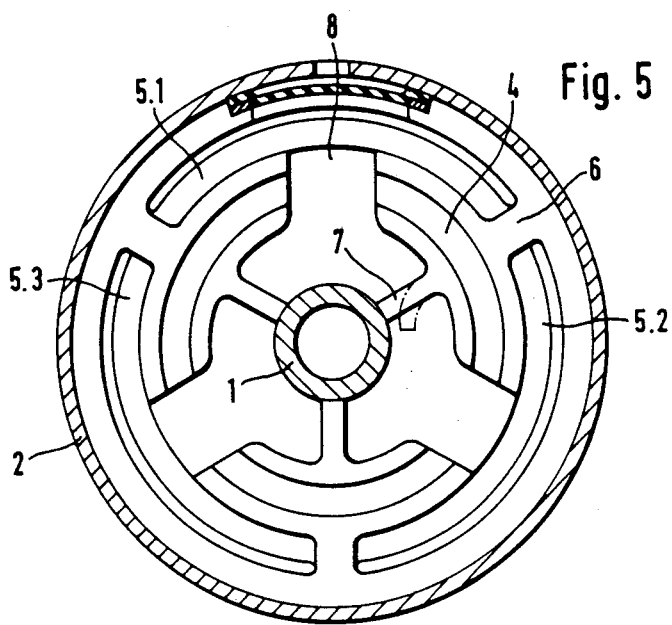
FIG. 5 is a cross-sectional view of a rubber bearing of the invention which includes three chambers.

The embodiment illustrated in FIG. 5, in contrast to those shown in FIGS. 2 and 4, has three chambers 5.1, 5.2 and 5.3 which also tends to damp oscillations in all radial directions. The throttle passages 4 and the bypass passages 8 are again located in a common plane at the facing surfaces 6. The chambers 5.1, 5.2 and 5.3 are all connected to one another with each of three valves 7 being capable of responding to pressure differentials in each pair of adjacent chambers 5.1, 5.2 and 5.3 in both pressure directions.

Figure 6:
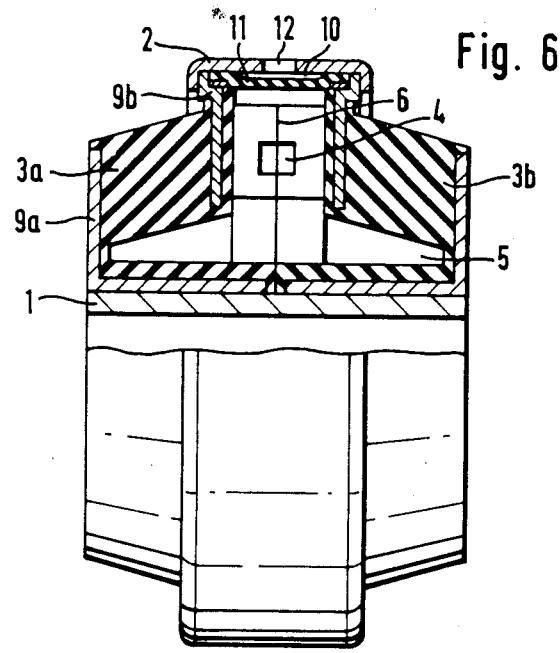
FIG. 6 is a side view, partially in section, of another embodiment of a rubber bearing including various features of the invention in cross section.
Figure 7:
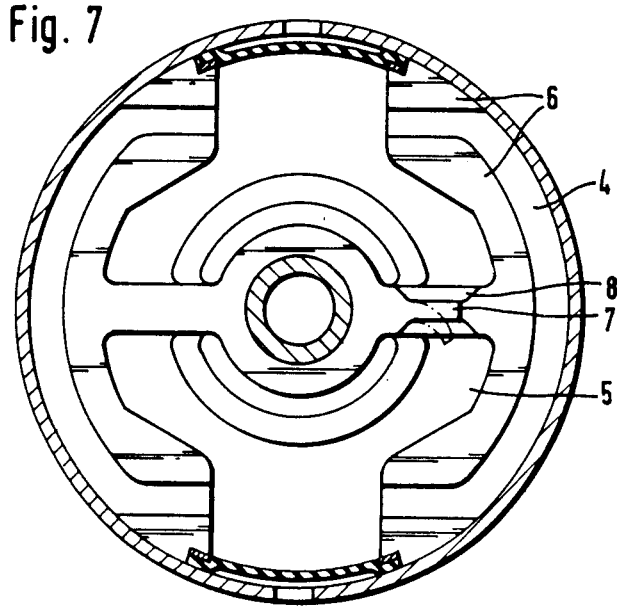
FIG. 7 is a cross-sectional view of the rubber bearing shown in FIG. 6.

The alternative embodiment illustrated in FIGS. 6 and 7 includes a rubber bearing of the invention in which two chambers 5 are facing the internal tube 1 as the shear elements 3a and 3b extend radially outward therefrom. The design principle and the method of operation are the same as the examples illustrated in FIGS. 1 to 5. For damping, the chambers 5 are provided with throttle passages 4 and with at least one passage 8 having a valve 7 and serving as a bypass to throttle passages 4. With only two chambers 5, the damping is limited to only one direction (vertically, as seen in FIG. 7). In this alternative configuration, the throttle passages 4 and the passage 8 are housed in the facing surfaces 6 of the two shear elements 3a and 3b, which become functional after assembly. For decoupling, a recess 10 is vented outwardly through a ventilation hole 12. The recess 10 is sealed from the chamber 5 by a membrane 11.

The shear elements 3a and 3b each include an internal reinforcement 9a and an external reinforcement 9b, so that, after assembly of the internal tube 1 and the external tube 2, the finished rubber bearing is formed.

In summing up, one aspect of the invention resides broadly in a hydraulically damping rubber bearing which comprises an internal tube, an external tube located at some distance from it, and a rubber spring inserted between them. Chambers formed in the rubber spring are filled with damping fluid, and connected hydraulically to one another by an arrangement of throttle channels. The chambers are bounded exclusively by the rubber spring and are externally sealed. The two chambers are connected to one another by the use of a channel having at least one valve and are characterized by the fact that the rubber spring 3 extends around the circumference and is designed simultaneously as the bearing spring and seal element.

The rubber bearing may be further characterized by the fact that the rubber spring 3 consists of two identical ring-shaped shear elements 3a, 3b.

The rubber bearing may also be characterized by the fact that the throttle passages 4 are designed as recesses 4a, 4b in the facing surfaces 6 of the shear elements 3a, 3b, which form the throttle passage 4 when they are assembled.

The rubber bearing may include at least one passage 8 formed by recesses in the facing surfaces 6 of the shear elements 3a, 3b, which form the passage 8 when they are assembled.

The valve 7 may be an integral part of the rubber spring 3 and include an elastic rubber lip.

The rubber bearing may be characterized by the fact that in at least one chamber 5 there is a recess 10 which is sealed by a membrane 11.

Finally, the rubber bearing may also be characterized by the fact that the rubber spring 3 has a reinforcement for fastening to the internal tube 1 and/or the external tube 2.

The invention as described hereinabove in the context of a preferred embodiment is not to be taken as limited to all of the provided details thereof, since modifications and variations there of may be made without departing from the spirit and scope of the invention.

What is claimed is:

1. Hydraulic damping elastomeric bearing comprising:
    an internal element;
    an external element disposed around said internal element to be radially spaced therefrom;
    an elastomeric spring means disposed between said internal element and said external element;
    said elastomeric spring means defining cavity means therein;
    said elastomeric spring means providing sealing for a boundary of said cavity means;
    said cavity means including at least two chambers for being filled with a damping fluid;
    throttling means for throttled fluid connection of at least one of said chambers and at least another of said chambers;
    said cavity means including said throttling means;
    said cavity means includes additional connecting means for additional fluid connection of said at least one of said chambers and said at least another of said chambers;
    said additional connecting means includes valve means; and
    said valve means being an integral part of said elastomeric spring means.

2. The elastomeric bearing according to claim 1, wherein said valve means includes an elastomeric lip.

3. The elastomeric bearing according to claim 2, wherein said valve means is opened by a pressure differential between said at least one of said chambers and said at least another of said chambers.

4. The elastomeric bearing according to claim 1, wherein said elastomeric spring means includes a deflectable membrane portion for at least one of said chambers.

5. The elastomeric bearing according to claim 1, wherein said elastomeric spring means includes reinforcement means for fastening said elastomeric spring means to at least one of said internal element and said external element.

6. The elastomeric bearing according to claim 1, wherein said cavity means includes two of said at least two chambers.

7. The elastomeric bearing according to claim 1, wherein said cavity means includes three of said at least two chambers.

8. The elastomeric bearing according to claim 1, wherein said chambers are evenly disposed around said internal member.

9. Hydraulic damping elastomeric bearing comprising:
    an internal element;
    an external element disposed around said internal element to be radially spaced therefrom;
    an elastomeric spring means disposed between said internal element and said external element;
    said elastomeric spring means defining cavity means therein;
    said elastomeric spring means providing sealing for a boundary of said cavity means;
    said cavity means including at least two chambers for being filled with a damping fluid;
    throttling means for throttled fluid connection of at least one of said chambers and at least another of said chambers;
    said cavity means including said throttling means;
    said elastomeric spring means being formed of two ring-shaped shear elements;
    each of said ring-shaped shear elements including inner reinforcement and outer reinforcement;
    each of said outer reinforcements for being connected to said external element;
    said ring-shaped shear elements including facing surfaces; and
    said chambers and said throttling means being defined by recesses said facing surfaces when said ring-shaped shear elements are adjoined;
    wherein said cavity means includes additional connecting means for additional fluid connection of said at least one of said chambers and said at least another of said chambers; and said additional connecting means includes valve means;
    wherein said valve means is an integral part of said elastomeric spring means.

10. The elastic bearing according to claim 9, wherein said additional connecting means are defined by additional recesses in said facing surfaces when said ring-shaped shear elements are joined.

11. The elastomeric bearing according to claim 9, wherein said valve means includes an elastomeric lip.

* * * * *